United States Patent [19]

Jow et al.

[11] Patent Number: 5,288,785
[45] Date of Patent: Feb. 22, 1994

[54] LOW VOLTAGE POWER CABLES

[75] Inventors: Jinder Jow, Branchburg; Sundaresan Ramachandran, Flemington; Michael J. Keogh, Bridgewater, all of N.J.

[73] Assignee: Union Carbide Chemicals & Plastics Technology Corporation, Danbury, Conn.

[21] Appl. No.: 76,457

[22] Filed: Jun. 14, 1993

[51] Int. Cl.$^5$ .............................................. C08K 9/04
[52] U.S. Cl. .............................. 524/436; 174/110 SR
[58] Field of Search ............... 174/110 PM, 110 SR; 524/436

[56] References Cited

U.S. PATENT DOCUMENTS

| | | | |
|---|---|---|---|
| 4,420,580 | 12/1983 | Herman et al. | 524/436 |
| 4,722,858 | 2/1988 | Harbourne et al. | 428/220 |
| 4,722,959 | 2/1988 | Inoue et al. | 524/437 |
| 4,839,412 | 6/1989 | Harrell et al. | 524/436 |
| 4,847,317 | 7/1989 | Dokumo et al. | 524/437 |

FOREIGN PATENT DOCUMENTS

| | | |
|---|---|---|
| 356139 | 2/1990 | European Pat. Off. |
| 370517 | 5/1990 | European Pat. Off. |

Primary Examiner—Veronica P. Hoke
Attorney, Agent, or Firm—Saul R. Bresch

[57] ABSTRACT

A flame retardant composition comprising:
(i) a linear polyethylene having a density equal to or less than 0.915 gram per cubic centimeter;
(ii) a linear polyethylene having a density in the range of 0.916 to 0.925 gram per cubic centimeter, grafted with an unsaturated aliphatic diacid anhydride, said polyethylene being present in an amount of about 40 to about 400 parts by weight based on 100 parts by weight of component (i); and
(iii) magnesium hydroxide, surface treated with an organic phosphate ester or a salt thereof in an amount of about 0.1 to about 4 parts by weight of ester per 100 parts by weight of magnesium hydroxide, said magnesium hydroxide being present in an amount of about 90 to about 400 parts by weight based on 100 parts by weight of component (i).

8 Claims, No Drawings

LOW VOLTAGE POWER CABLES

TECHNICAL FIELD

This invention relates to low voltage power cables and, more particularly, to the insulating layer(s) of the cable.

BACKGROUND INFORMATION

A typical low voltage power cable is constructed of metal conductors insulated with a polymeric material. These elements are generally twisted to form a core and are protected by another polymeric sheath or jacket material. In certain cases, added protection is afforded by inserting a wrap between the core and the sheath.

In order to have the low voltage power cable approved by the Underwriters Laboratories, the insulation must pass a stringent test with regard to its long term "wet" electrical properties at an elevated temperature under a specified electrical stress, e.g., a temperature of 75° C. at a stress of 600 volts per 15 or 45 mil layer. The term or period of time for immersion in water is a minimum of 12 weeks. The test is described in Underwriters Laboratories 83 (UL-83), Tenth Edition, revision dated Sep. 25, 1991, paragraphs 30.1 to 30.4.

It will be apparent to those skilled in the art that insulation meeting this severe test is decidedly more capable of successfully dealing with wet applications than those highly filled cables which have a tendency, when exposed to water, to increase charge species movement, i.e., conductivity, within the polymer structure thus lowering insulation resistance (IR). It is expected, however, that the cable will not only meet the UL-83 test, but the UL-44 requirements as well provided that the cable is crosslinked. Good flame retardance, low smoke, low corrosivity, and low toxicity add to the industrial requirements for low voltage power cable, which will be exposed to aggravated water conditions.

DISCLOSURE OF THE INVENTION

An object of this invention, then, is to provide a composition useful as insulation in low voltage power cable construction, which will meet UL-83, UL-44, and other industrial requirements for insulation having the capability of surviving an extremely wet environment. Other objects and advantages will become apparent hereinafter.

According to the invention, a composition has been discovered which meets the above objective. This composition comprises:

(i) a linear polyethylene having a density equal to or less than 0.915 gram per cubic centimeter;

(ii) a linear polyethylene having a density in the range of 0.916 to 0.925 gram per cubic centimeter, grafted with an unsaturated aliphatic diacid anhydride, said grafted polyethylene being present in an amount of about 40 to about 400 parts by weight based on 100 parts by weight of component (i); and (iii) magnesium hydroxide, surface treated with an organic phosphate ester or a salt thereof in an amount of about 0.1 to about 4 parts by weight of ester per 100 parts by weight of magnesium hydroxide, said magnesium hydroxide being present in an amount of about 90 to about 400 parts by weight based on 100 parts by weight of component (i).

DESCRIPTION OF THE PREFERRED EMBODIMENT(S)

The polyethylenes useful for components (i) and (ii) are copolymers of ethylene and one or more alpha-olefins having 3 to 12 carbon atoms and preferably 3 to 8 carbon atoms. The density of the component (i) polyethylene is equal to or less than 0.915 gram per cubic centimeter and is preferably 0.860 to 0.910 gram per cubic centimeter. The density of the component (ii) polyethylene, before grafting, is in the range of 0.916 to 0.925 gram per cubic centimeter. Both polyethylenes are linear. The alpha-olefins useful in preparing the ethylene copolymers are propylene, 1-butene, 1-hexene, 4-methyl-1-pentene, and 1-octene. The polyethylenes can be produced, for example, in the presence of (i) a catalyst containing chromium and titanium; (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the copolymer are described in U.S. Pat. Nos. 4,101,445 and 4,302,565 and European patent application No. 120 501.

The melt index of the component (i) polyethylene can be in the range of about 0.1 to about 20 grams per 10 minutes and is preferably in the range of about 0.3 to about 5 grams per 10 minutes. The melt index is determined in accordance with ASTM D-1238, Condition E, measured at 190° C. The melt index of the component (ii) polyethylene, before grafting, can be in the range of about 0.5 to about 20 grams per 10 minutes and is preferably in the range of about 1 to about 10 grams per 10 minutes. The portion of either polyethylene attributed to the comonomer(s), other than ethylene, is in the range of about 1 to about 49 percent by weight based on the weight of the copolymer and is preferably in the range of about 15 to about 40 percent by weight.

Component (ii) polyethylene can be present in an amount of about 40 to about 400 parts by weight based on 100 parts by weight of the component (i) polyethylene and is preferably present in an amount of about 40 to about 140 parts by weight.

Anhydrides of unsaturated aliphatic diacids are commonly grafted to various polyolefins. These anhydrides can have 4 to 20 carbon atoms and preferably have 4 to 10 carbon atoms. Examples of anhydrides, which are useful in this invention, are maleic anhydride, itaconic anhydride, and nadic anhydride. The preferred anhydride is maleic anhydride. Excess anhydride, if present after grafting, can be removed by devolatilization at temperatures in the range of about 200° C. to about 250° C.

The grafting is accomplished by using an organic peroxide catalyst, i.e., a free radical generator, such as dicumyl peroxide; lauroyl peroxide; benzoyl peroxide; tertiary butyl perbenzoate; di(tertiary-butyl) peroxide; cumene hydroperoxide; 2,5-dimethyl-2,5-di(t-butylperoxy)hexyne-3; 2,5-dimethyl-2,5-di(t-butyl-peroxy)-hexane; tertiary butyl hydroperoxide; isopropyl percarbonate; and alpha,alpha'-bis(tertiary-butylperoxy)diisopropylbenzene. The organic peroxide catalyst may be added together with the anhydride.

Grafting temperatures can be in the range of about 100° to about 300° C. and are preferably in the range of about 150° to about 200° C.

A typical procedure for grafting maleic anhydride onto polyethylene is described in U.S. Pat. No. 4,506,056.

Grafting can also be accomplished by adding a solution of anhydride, an organic peroxide catalyst, and an organic solvent to polyethylene in particulate form. The organic peroxide catalyst is soluble in the organic solvent. Various organic solvents, which are inert to the reaction, can be used. Examples of useful organic solvents are acetone, methyl ethyl ketone, methyl propyl ketone, 3-pentanone, and other ketones. Other carrier solvents which allow solubilization of peroxide and anhydride, and which strip off well under appropriate devolatilization conditions may be used. Acetone is a preferred solvent because it acts as a stripping agent for residuals such as non-grafted anhydride or anhydride by-products.

The anhydride solution can contain about 10 to about 50 percent by weight anhydride; about 0.05 to about 5 percent by weight organic peroxide catalyst; and about 50 to about 90 percent by weight organic solvent based on the total weight of the solution. A preferred solution contains about 20 to about 40 percent anhydride; about 0.1 to about 2 percent peroxide; and about 60 to about 80 percent solvent.

The anhydride grafted component (ii) polyethylene can contain about 0.05 to about 5 parts by weight of anhydride per 100 parts by weight of component (ii) polyethylene and preferably contains about 0.1 to about 2 parts by weight of anhydride per 100 parts by weight of component (ii) polyethylene.

The magnesium hydroxide is one conventionally used in wire and cable applications. A preferred magnesium hydroxide has the following characteristics: (a) a strain in the <101> direction of no more than $3.0 \times 10^{-3}$; (b) a crystallite size in the <101> direction of more than 800 angstroms; and (c) a surface area, determined by the BET method, of less than 20 square meters per gram.

The preferred magnesium hydroxide and a method for its preparation are disclosed in U.S. Pat. No. 4,098,762. A preferred characteristic of the magnesium hydroxide is that the surface area, as determined by the BET method, is less than 10 square meters per gram.

The amount of magnesium hydroxide used in the composition can be in the range of about 90 to about 400 parts by weight of magnesium hydroxide per 100 parts by weight of component (i) polyethylene and is preferably in the range of about 190 to about 340 parts by weight of magnesium hydroxide per 100 parts by weight of component (i) polyethylene.

The magnesium hydroxide is surface treated with an organic phosphate ester or a salt thereof, which can have about 10 to about 30 carbon atoms and preferably has about 12 to about 20 carbon atoms. The salt can be, for example, a dialcohol amine salt or an alkali metal salt of an alcohol phosphate ester. The salts can be represented by the following formulas:

wherein R=alkyl or alkylene having 10 to 30 carbon atoms; R'=alkyl having 1 to 6 carbon atoms; each R and R' can be the same or different and n=1 or 2 and

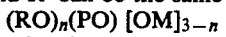

wherein R and n are the same as above; M is an alkali metal or hydrogen; and each M can be the same or different.

Additional examples of suitable organic phosphate esters are the sodium salt of lauryl alcohol phosphate ester; the diethanol amine salt of stearyl phosphate diester and monoester; the sodium salt of erucyl alcohol phosphate ester; the diethanol amine salt of an aralkyl alcohol phosphate ester wherein the aralkyl has 15 to 25 carbon atoms; the sodium salt of distearyl alcohol phosphate ester; and the diethanol amine salt of oleyl alcohol phosphate ester. Organic phosphate esters are described in European Patent Application No. 0 356 139. The amount of ester can be in the range of about 0.1 to about 4 parts by weight of ester per one hundred parts by weight of magnesium hydroxide and preferably is about 0.15 to about 2.5 parts by weight per one hundred parts by weight of magnesium hydroxide.

Various conventional additives can be added in conventional amounts to the composition of the invention. Typical additives are antioxidants, ultraviolet absorbers, antistatic agents, pigments, dyes, various fillers including carbon black and aluminum silicate, slip agents, flame retardants, stabilizers, crosslinking agents, halogen scavengers, smoke inhibitors, crosslinking boosters, processing aids, e.g., metal carboxylates, lubricants, plasticizers, and viscosity control agents. Generally, the additives are introduced into the composition in amounts of about 0.1 to about 5 parts by weight per 100 parts by weight of component (i) polyethylene except for fillers and flame retardants, which can be present in amounts of up to 60 parts by weight and more.

The insulation is useful in combination with electrical conductors comprised of metal such as copper or carbon, or with communications medium such as glass or plastic filaments used, for example, in fiber optics applications.

Patents and other publications mentioned in this specification are incorporated by reference herein.

The invention is illustrated by the following examples.

EXAMPLES 1 TO 5

Polyethylene I (PE I) is a linear copolymer of ethylene and 1-butene having a density of 0.900 gram per cubic centimeter and a melt index of 0.4 gram per 10 minutes.

Polyethylene II (PE II) is a maleinized linear copolymer of ethylene and 1-hexene having a density of 0.917 gram per cubic centimeter and a melt index of 1.4 grams per 10 minutes. The polyethylene is grafted with 0.3 part by weight maleic anhydride per 100 parts by weight of polyethylene according to the procedure mentioned above.

Magnesium Hydroxide I (MH I) is surface treated with 2 percent by weight of the diethanol amine salt of distearyl alcohol phosphate ester based on the weight of the magnesium hydroxide.

Magnesium Hydroxide II (MH II) is surface treated with 0.25 percent by weight of oleic acid based on the weight of the magnesium hydroxide.

Magnesium Hydroxide III (MH III) is not surface treated.

Antioxidant I is tetrakis[methylene(3,5-di-tert-butyl-4-hydroxyhydrocinnamate)]methane, and is present in an amount of 0.2 percent by weight based on the weight of the composition.

Antioxidant II is distearyl thiodipropionate, and is present in an amount of 0.2 percent by weight based on the weight of the composition.

The variables and results are set forth in the Tables. Amounts are in percent by weight based on the weight of the composition. The UL-83 minimum requirement for a 14 AWG solid copper wire with a 15 mil layer of insulation is as follows: a tensile strength of 2000 psi; an elongation of 150 percent; and a wet IR of 0.115 megaohms per 1000 feet. Such a wire is prepared using the compositions of examples 1 to 5 as the insulation layer. These insulated wires are then tested to see if they meet the minimum requirements of UL-83.

TABLE I

| example | 1 | 2 | 3 | 4 | 5 |
|---|---|---|---|---|---|
| PE I | 39.60 | 29.60 | 17.60 | 39.60 | 39.60 |
| PE II | — | 12.00 | 24.00 | — | — |
| MH I | 60.00 | 58.00 | 58.00 | — | — |
| MH II | — | — | — | 60.00 | — |
| MH III | — | — | — | — | 60.00 |

TABLE II

| example | 1 | 2 | 3 | 4 | 5 |
|---|---|---|---|---|---|
| T/E (psi/%) | 1650/175 | 2615/355 | 3345/245 | 1850/200 | 1840/170 |
| wet IR (MΩ/1000 ft) week | | | | | |
| 1 | 22500 | 2700 | 1200 | 0 | <0.025 |
| 2 | 16500 | 900 | 405 | failed | failed |
| 3 | 13500 | 750 | 315 | | |
| 4 | 11700 | 1200 | 225 | | |
| 5 | 10500 | 600 | 218 | | |
| 6 | 10050 | 300 | 210 | | |
| 7 | 9300 | 300 | 210 | | |
| 8 | 5400 | 120 | 255 | | |
| 9 | 7800 | 120 | 210 | | |
| 10 | 7800 | 90 | 135 | | |
| 11 | 6900 | 120 | 120 | | |
| 12 | 7200 | 210 | 95 | | |
| 13 | 7050 | 210 | 105 | | |

Notes to Tables:
1. T/E (psi/%) = The first number is tensile strength and it is reported in pounds per square inch; the second number is elongation and it is reported in percent. Both are determined under ASTM D-412.
2. Wet IR (MΩ/1000 ft) = wet insulation resistance in megaohms per 1000 feet. The test is set forth in UL-83 referred to above.
3. The term "failed" means that the composition exhibits no insulation properties at this point in time.
4. All of the compositions pass the UL-83 flame test with either a VW-1 rating or an All Wire rating.

We claim:
1. A flame retardant composition comprising:
(i) a linear polyethylene having a density equal to or less than 0.915 gram per cubic centimeter;
(ii) a linear polyethylene having a density in the range of 0.916 to 0.925 gram per cubic centimeter, grafted with an unsaturated aliphatic diacid anhydride, said polyethylene being present in an amount of about 40 to about 400 parts by weight based on 100 parts by weight of component (i); and
(iii) magnesium hydroxide, surface treated with an organic phosphate ester or a salt thereof in an amount of about 0.1 to about 4 parts by weight of ester per 100 parts by weight of magnesium hydroxide, said magnesium hydroxide being present in an amount of about 90 to about 400 parts by weight based on 100 parts by weight of component (i).

2. The composition defined in claim 1 wherein component (i) has a melt index in the range of about 0.1 to about 20 grams per 10 minutes; component (ii) has a melt index, before grafting, in the range of about 0.5 to about 20 grams per 10 minutes; and the amount of anhydride grafted is in the range of about 0.05 to about 5 parts by weight per 100 parts by weight of component (ii) polyethylene.

3. The composition defined in claim 1 wherein both polyethylenes are copolymers of ethylene and one or more alphaolefins having 3 to 12 carbon atoms.

4. The composition defined in claim 1 wherein the anhydride is maleic anhydride.

5. The composition defined in claim 1 wherein the magnesium hydroxide is surface treated with a dialcohol amine salt or an alkali metal salt of an alcohol phosphate ester.

6. A flame retardant composition comprising:
(i) a linear copolymer of ethylene and one or more alphaolefins having 3 to 8 carbon atoms and having a density in the range of 0.860 to 0.915 gram per cubic centimeter and a melt index in the range of about 0.3 to about 5 grams per 10 minutes;
(ii) a linear copolymer of ethylene and one or more alphaolefins having 3 to 8 carbon atoms and having a density in the range of 0.916 to 0.925 gram per cubic centimeter and a melt index in the range of about 1 to about 10 grams per 10 minutes, grafted with maleic anhydride in an amount of about 0.1 to about 2 parts by weight of maleic anhydride per 100 parts by weight of said copolymer, said copolymer being present in an amount of about 40 to about 140 parts by weight based on 100 parts by weight of component (i); and
(iii) magnesium hydroxide, surface treated with a dialcohol amine salt or an alkali metal salt of an alcohol phosphate ester in an amount of about 0.15 to about 2.5 parts by weight of ester per 100 parts by weight of magnesium hydroxide wherein the magnesium hydroxide has the following characteristics: (a) a strain in the <101> direction of not more than $3.0 \times 10^{-3}$; (b) a crystallite size in the <101> direction of more than 800 angstroms; and (b) a surface area, determined by the BET method, of less than 10 square meters per gram, said magnesium hydroxide being present in an amount of about 190 to about 340 parts by weight based on 100 parts by weight of component (i).

7. An article of manufacture comprising an electrical conductor or a communications medium insulated with the composition defined in claim 1.

8. An article of manufacture comprising an electrical conductor surrounded by one or more layers of the composition defined in claim 6.

* * * * *